United States Patent [19]
Thompson et al.

[11] Patent Number: 5,805,204
[45] Date of Patent: Sep. 8, 1998

[54] SYSTEM AND METHOD FOR COMMUNICATING DATA AND OBJECTIVE CODE FOR AN INTERACTIVE VIDEO GUIDE SYSTEM

[75] Inventors: John R. Thompson, LaQuinta; Craig E. Trivelpiece; Steve E. Trivelpiece, both of Newport Beach, all of Calif.

[73] Assignee: Prevue Interactive, Inc., Tulsa, Okla.

[21] Appl. No.: 806,243

[22] Filed: Feb. 20, 1997

Related U.S. Application Data

[63] Continuation of Ser. No. 959,042, Oct. 9, 1992, Pat. No. 5,644,354.

[51] Int. Cl.$^6$ .............................. H04N 7/10; H04N 7/14
[52] U.S. Cl. .............................. 348/13; 348/12; 348/906; 455/5.1
[58] Field of Search .................. 348/6, 7, 12, 13, 348/906, 9, 722, 180, 563, 460, 461, 467, 468, 473, 476, 477, 478, 479, 552, 553, 564, 567, 570, 406; 455/4.1, 4.2, 6.1, 6.2, 5.1, 6.3, 3.2; H04N 5/445

[56] References Cited

U.S. PATENT DOCUMENTS

| | | | |
|---|---|---|---|
| 4,058,830 | 11/1977 | Guinet et al. | 358/86 |
| 4,488,179 | 12/1984 | Krüger et al. | 358/181 |
| 4,536,791 | 8/1985 | Campbell et al. | 358/122 |
| 4,602,279 | 7/1986 | Freeman | 358/86 |
| 4,614,970 | 9/1986 | Clupper et al. | 358/120 |
| 4,623,920 | 11/1986 | Dufresne et al. | 358/122 |
| 4,691,351 | 9/1987 | Hayashi et al. | 380/10 |
| 4,694,490 | 9/1987 | Harvey et al. | 380/20 |
| 4,695,880 | 9/1987 | Johnson et al. | 358/86 |
| 4,706,121 | 11/1987 | Young | 358/142 |
| 4,751,578 | 6/1988 | Reiter et al. | 358/183 |
| 4,768,087 | 8/1988 | Taub et al. | 358/84 |
| 4,768,228 | 8/1988 | Clupper et al. | 380/20 |
| 4,787,063 | 11/1988 | Muguet | 364/900 |
| 4,833,710 | 5/1989 | Hirashima | 380/20 |
| 4,862,268 | 8/1989 | Campbell et al. | 358/141 |
| 4,890,321 | 12/1989 | Seth-Smith et al. | 380/20 |
| 4,896,347 | 1/1990 | Auber | 379/96 |
| 4,963,994 | 10/1990 | Levine | 358/335 |

(List continued on next page.)

FOREIGN PATENT DOCUMENTS 60-61935  9/1955  Japan .

OTHER PUBLICATIONS

CableData brochure, "A New Approach To Addressability" (Undated).
"Addressable Converters: A New Development at Cable-Data," *Via Cable*, vol. 1, No. 12 (Dec. 1981).

*Primary Examiner*—Michael Lee
*Attorney, Agent, or Firm*—Fish & Neave

[57] ABSTRACT

An interactive video guide system is provided in which nationally generic guide data, local guide data, and interactive video guide object code are transmitted to set-top decoder units located in customers' homes. Initially, nationally generic data or program information from a variety of sources is gathered together via modem at a central processing unit, and then manipulated, parsed and formatted into a national database compatible for use by a head end computer. This information is typically collected and updated on a daily basis. The manipulated nationally generic data is then transferred via modem to a transmitter for uplink to a selected telecommunications satellite. The satellite signal is then received by one or more local satellite CATV head end receivers which then forward a video base band signal carrying the nationally generic data to associated local head end computers. At the local head end computer, the nationally generic data is again manipulated, winnowed, parsed and processed to suit the requirements of the particular local market. Local guide data and interactive video guide object code may then be added to the nationally generic data and then the combined data and object code is transmitted over the CATV system to one or more decoder units in the consumers' homes.

17 Claims, 5 Drawing Sheets

U.S. PATENT DOCUMENTS

| | | | |
|---|---|---|---|
| 4,977,455 | 12/1990 | Young | 358/142 |
| 5,038,211 | 8/1991 | Hallenbeck | 358/142 |
| 5,093,718 | 3/1992 | Hoarty et al. | 358/84 |
| 5,099,319 | 3/1992 | Esch et al. | 358/86 |
| 5,119,188 | 6/1992 | McCalley et al. | 38/86 |
| 5,132,992 | 7/1992 | Yurt et al. | 375/122 |
| 5,151,789 | 9/1992 | Young | 358/194.1 |
| 5,172,413 | 12/1992 | Bradley et al. | 380/20 |
| 5,210,611 | 5/1993 | Yee et al. | 358/191.1 |
| 5,220,420 | 6/1993 | Hoarty et al. | 358/86 |
| 5,231,665 | 7/1993 | Auld et al. | 380/20 |
| 5,235,415 | 8/1993 | Bonicel et al. | 358/84 |
| 5,253,066 | 10/1993 | Vogel | 358/188 |
| 5,283,639 | 2/1994 | Esch et al. | 348/6 |
| 5,345,594 | 9/1994 | Tsuda | 455/18 |
| 5,353,121 | 10/1994 | Young et al. | 348/563 |
| 5,404,393 | 4/1995 | Remillard | 379/96 |
| 5,412,720 | 5/1995 | Hoarty | 380/15 |
| 5,479,268 | 12/1995 | Young et al. | 358/335 |
| 5,481,609 | 1/1996 | Cohen et al. | 380/16 |
| 5,576,755 | 11/1996 | Davis et al. | 348/13 |
| 5,579,055 | 11/1996 | Hamilton et al. | 348/478 |
| 5,592,551 | 1/1997 | Lett et al. | 348/3 |
| 5,635,978 | 6/1997 | Alten et al. | 348/7 |
| 5,644,354 | 7/1997 | Thompson et al. | 348/13 |
| 5,666,645 | 9/1997 | Thomas et al. | 455/6.1 |
| 5,684,525 | 11/1997 | Klosterman | 348/12 |
| 5,694,176 | 12/1997 | Bruette et al. | 348/563 |

SYSTEM AND METHOD FOR COMMUNICATING DATA AND OBJECTIVE CODE FOR AN INTERACTIVE VIDEO GUIDE SYSTEM

This is a continuation, of application Ser. No. 959,042, filed Oct. 9, 1992, entitled INTERACTIVE VIDEO SYSTEM now U.S. Pat. No. 5,644,590.

BACKGROUND OF THE INVENTION

This invention relates generally to video communication systems and more particularly concerns an interactive video information retrieval system enabling a viewer to access continually updated information resources such as program guides, sports activities, weather, financial reports and the like.

It is generally accepted that before the year 2000 there will be 150 plus cable channels to choose from. Such concepts as movies-on-demand, two-way interactive TV, interactive program guides, and enhanced "people meters" are already being tested or soon will be.

To facilitate the use of this technology, there is a need for an interactive video system that will help subscribers to navigate through their video resources. No such system is presently available.

Furthermore, while there is a need for subscriber flexibility in use of such a system, security to prevent unauthorized use of the system is also essential.

There are presently known smart card implementations which rely upon the use of an external and secure computer system to achieve data security. When the interface computer is not secure, such as when a product can be reverse engineered and the firmware modified and examined, then the security of these present methods is weak at best.

The four basic methods presently known for achieving security in known smart card systems are, therefore, inadequate to the present application. In one method, access applicating keys lock out various portions of a smart card until a valid key is presented to the card. The access keys may be presented in the clear or encrypted. In a clear key presentation, after the key is used once, then it is always known. In an encrypted key presentation, the smart card generates a random number. The decoder uses this random number, the key and the algorithm used in the decoder to generate the encrypted key data. Whether clear or encrypted, if all this information resides in the decoder firmware, then it can easily be reverse engineered.

Another security method employs random numbers. If a smart card generates a random number and sends this out, then it must receive the encrypted version of the random number using an internal key. But the only way an outside computer can generate the correct encrypted version is to have the same key and algorithm. As a result, the key and the algorithm must reside in the insecure decoder firmware.

A third security method uses authentication. Two way authentication provides good security where each side encrypts information with a known key and then the other unit must decrypt and then encrypt with another known key. This allows both sides to know that the other side has valid keys and the correct algorithm. But, for the decoder to do authentication with the smart card, all the information again resides in the insecure firmware.

One final security method exercises control of the smart card. It assumes that all the commands going to the smart card are generated and controlled by a secure computer. But in the case of the decoder of the present invention, all smart card commands can be intercepted or changed to the benefit of someone trying to defeat the system. Even something as simple as erasing a hidden key, which on some cards first requires that the key be unlocked, may open the information up to examination and changes.

It is, therefore, a primary object of this invention to provide an interactive, video display, data system affording flexibility to the subscriber in accessing a wide variety of data content and formats. In conformance with this primary object, it is further among the objects of this invention to provide an interactive, video display, data system that employs downloadable operating software at the customer's site, that enables the customer to operate the system by one of a variety of standard remote controls, that is capable of constant data base updating and that can be made available at little or no cost to the customer.

Another primary object of this invention is to provide an interactive, video display, data system that affords security to the cable company or other distributor against unauthorized access to the data base. In conformance with this primary object, it is further among the objects of this invention to provide an interactive, video display, data system which employs a smart card encryption-decryption system that has a decryption card at the customer's site which contains keys completely locked in the card, that uses a random feed key which precludes determination of a fixed key that will always work, and that is upgradable to extend and expand services available to the customer.

SUMMARY OF THE INVENTION

In accordance with the invention, an interactive video system is provided in which a composite digital information signal is formed by the combination of a winnowed generic information signal with a local information signal. This composite signal is further manipulated to produce an output signal which includes both data code and object code. This output signal is then formatted and transmitted via one or more modulator cards at the system head end to decoders located at the individual user's television set.

The signal transmitted from the modulator card is formed by use of a dynamic gate array having a configuration sequence determined and maintained by a resident configuration EPROM. Consequently, the configuration of the array can be changed in the field by the replacement of the EPROM. Data is fed to the configured array under the control of a control data EPROM also resident in the modulator card. A transmission modulator in the modulator card receives the data from the dynamic gate array for transmission via any selected medium to the user's location. For example, the transmission modulator may be a radio frequency transmitter in which an RF amplifier is driven by a voltage control oscillator which is in turn controlled by an RF synthesizer which is responsive to the formatted data signal.

Each of the decoders includes a microprocessor, a frequency agile receiver, memory and a custom gate array. The formatted signal containing the data code and object code is sensed by the frequency agile receiver which, under the direction of the microprocessor, scans for frequencies at which data identified by the microprocessor will be available. When an appropriate data containing frequency is sensed, the microprocessor causes the selected portions of data code and object code contained in the formatted signal to be passed to the memory for storage. The microprocessor then accesses the object code which was passed to the storing means to control the processing of the data code which was passed to the storing means. The custom gate array receives the data code and object code from the frequency agile receiver, passes it to the memory and ultimately, under the direction of the microprocessor, passes processed portions of the data code to the customer's video display device.

Each decoder also includes a boot ROM containing a small portion of the object code to enable the microprocessor to receive the full object code contained in the formatted signal.

The present interactive, video display, data system broadcasts from a single point to multiple units and is not bidirectional. If it is desirable that the system be secure against unauthorized use, then the encrypted data stream must be decrypted simultaneously by many receivers. Each receiver must be able to use the same key to decode the data stream. Smart cards are used to securely hold the keys and allow secure distribution of the keys.

The data stream is encrypted using a random seed key. While the seed key changes from time to time in a random fashion, all data sent at any particular time uses the same key. The seed key is doubly encrypted, using keys that are contained and completely locked into every smart card. This random seed is transmitted in the clear with the encrypted data stream and with pointers to indicate which keys were used. This random seed is passed into the smart card and doubly encrypted before the result can be read out. The encrypted key is now passed to decryption hardware in the decoder to decrypt the data stream. Because the keys are never read out from the smart card and are completely locked, the system is secure against discovery of the hidden keys. No commands issued to the smart card will reveal these keys. The random seed precludes the possibility of finding a fixed key that will always work and the double encryption makes it virtually impossible to figure out the two hidden keys by brute force on the algorithm.

To secure key distribution, the hidden keys used in the smart card are only valid for a specific period of time. The system may use one key per month and may also periodically change the system wide keys. New keys are loadable into the smart card without someone else being able to determine them. When an upgrade card containing new keys is distributed, the decoder transfers these new keys into the existing smart card in a secure fashion. During the transfer, the keys are not identifiable. Furthermore, the transfer is unique from decoder to decoder. Otherwise, the data stream from the upgrade card can be recorded and used on another decoder without having to know the keys or protocols. In addition, the upgrade card is not usable by any other decoder after it has been used once. But, the upgrade card is reusable for the same decoder in the event that the upgrade didn't function correctly, due., for example, to power failure during the process or user error. Finally, the upgrade card is generic so that it can be used on any card. To accomplish this, each decoder smart card contains a set of "random" and unique numbers, basically secret serial numbers. These can only be read out in encrypted format. One of a set of system wide keys is used to read out a particular serial number. This encrypted serial number is transferred to the upgrade card and decrypted by pointing to the same system wide key that resides in the upgrade card. The serial number is now locked in the upgrade card but has not been revealed by the data stream because it was encrypted. The serial number plus a different system key is used to encrypt the new monthly keys to be transferred to the decoder smart card. At the decoder smart card, the new keys are locked and decrypted into files.

This process resolves all the above concerns. All transfers are encrypted using hidden keys. The transfers use a serial number which is unique to each decoder. Once the serial number is stored in the upgrade card it cannot be changed or removed, so this prevents a different decoder from using the upgrade card. The upgrade card can still be used to upgrade the decoder smart card in case of a transfer failure. There is nothing specific in the upgrade card that prevents it from being used with any valid decoder.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
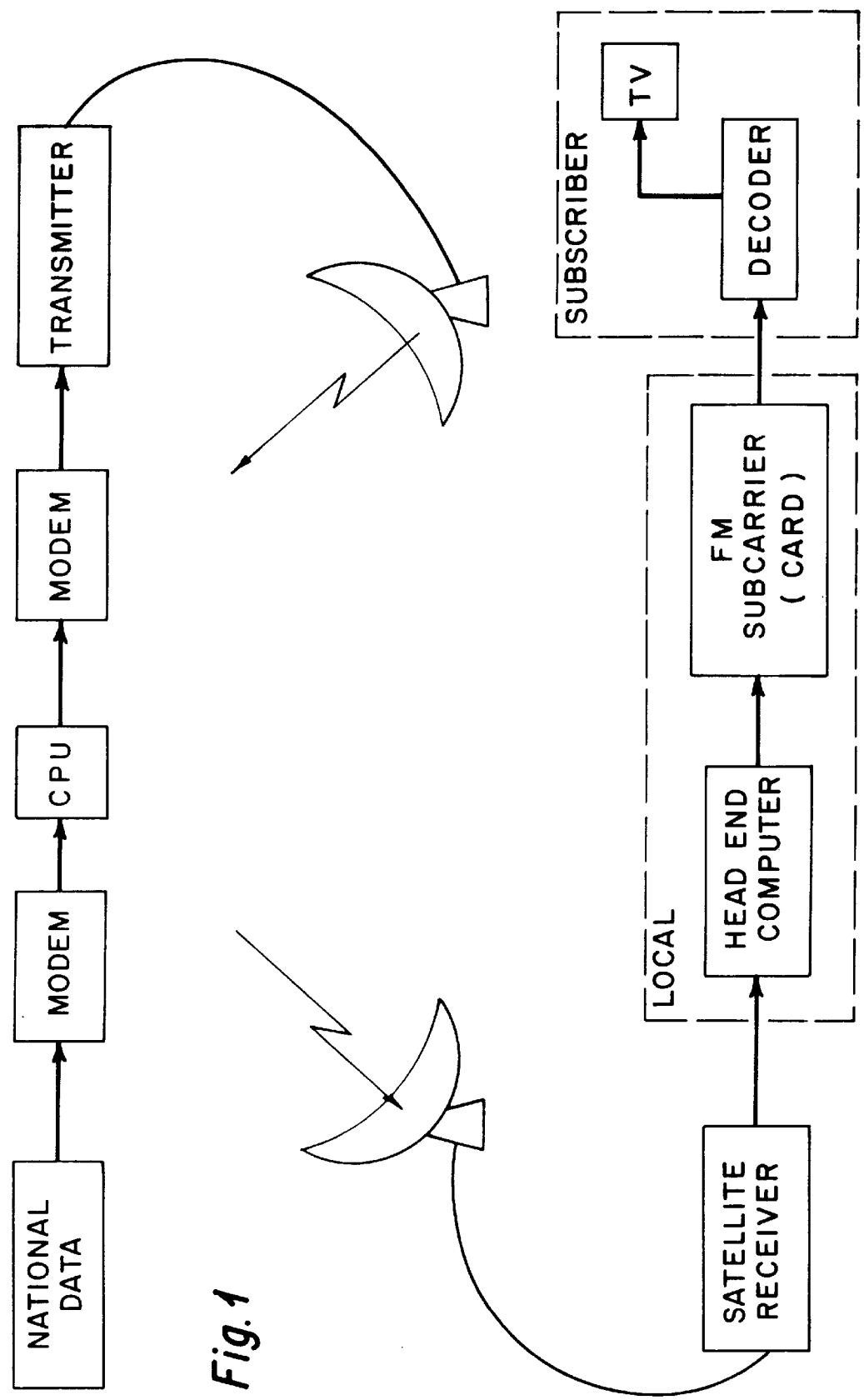
FIG. 1 is a block diagram illustrating a typical transmission system into which the present interactive, video display, data system may be incorporated.
Figure 2:
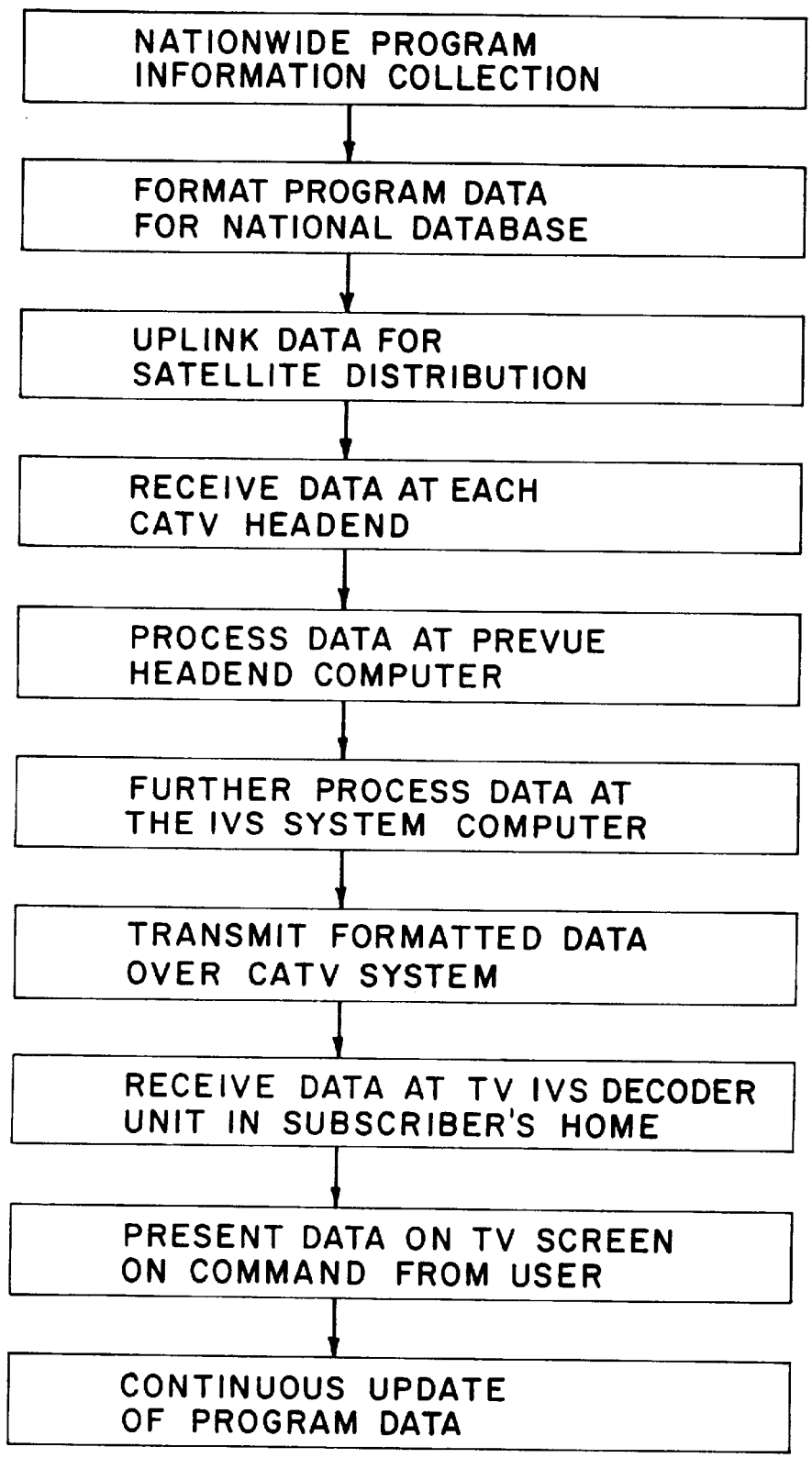
FIG. 2 is a flow chart illustrating the operation of the transmission system of FIG. 1 with the interactive, video display, data system of the present invention incorporated therein.

Turning first to FIGS. 1 and 2, a video transmission system is illustrated in which nationally generic data or program information from a variety of sources is gathered together via modem at a central processing unit which manipulates, parses and formats the program data into a national database compatible for use by a head end computer. This information is typically collected and updated on a daily basis. The manipulated nationally generic data is then transferred via modem to a transmitter for uplink to a selected telecommunications satellite. The satellite signal is then received by one or more local satellite CATV head end receivers which then forward a video base band signal carrying the nationally generic data to their local head end computers. At the local head end computer, including the interactive, video display, data system computer, the data is again manipulated, winnowed, parsed and processed to suit the requirements of the particular local market and the formatted data is transmitted over the CATV system to a decoder unit at the VHF input of the customer's TV set where it can be presented on the TV screen on command from the customer. The program data is continuously updated by the system. The present invention is concerned with the manipulation of the data at the local level of such a system and the interactive use of the manipulated data by the customer.

Figure 3:
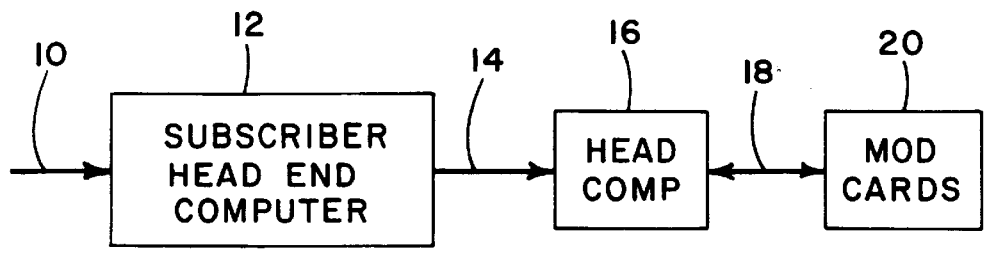
FIG. 3 is a block diagram illustrating a generic embodiment of a head-end computer of the interactive, video display, data system.

A generic embodiment of a local head end computer is illustrated in FIG. 3. The video base band signal carrying the nationally generic data 10 is received by the subscriber or local head end computer 12. The subscriber head end computer 12 includes a board for demodulating the video base band signal 10 to a digital signal. It deletes locally unwanted data from the nationally generic data stream, adds desirable local information to the data stream and modifies the data signal to produce a composite digital signal 14 which is then fed, preferably through a parallel port, into an interactive, video display, data system head end computer 16. The composite signal 14 could be fed into the system head end computer 16 via a serial port, but this would slow the data handling process. The system head end computer 16 manipulates the data in accordance with resident programming to build a file. The resident programming includes the programs to properly process the incoming data, the program to be downloaded to the system decoders in order to make them operate and the data protocol programs that allow the data to be formatted and sent over the cable system in the manner presented by the detailed design of the system. Current file data 18 to be sent to the system decoders is fed via the internal bus of the system head end computer 16 to one or more modulator cards 20 which constitutes a dedicated controller for the system's data transmission. Each modulator card formats its input signal 18 which includes both the data code and the object code necessary to the operation of the consumers decoder equipment. The card 20 may also encrypt the data code for purposes of subscriber security.

Figure 4:
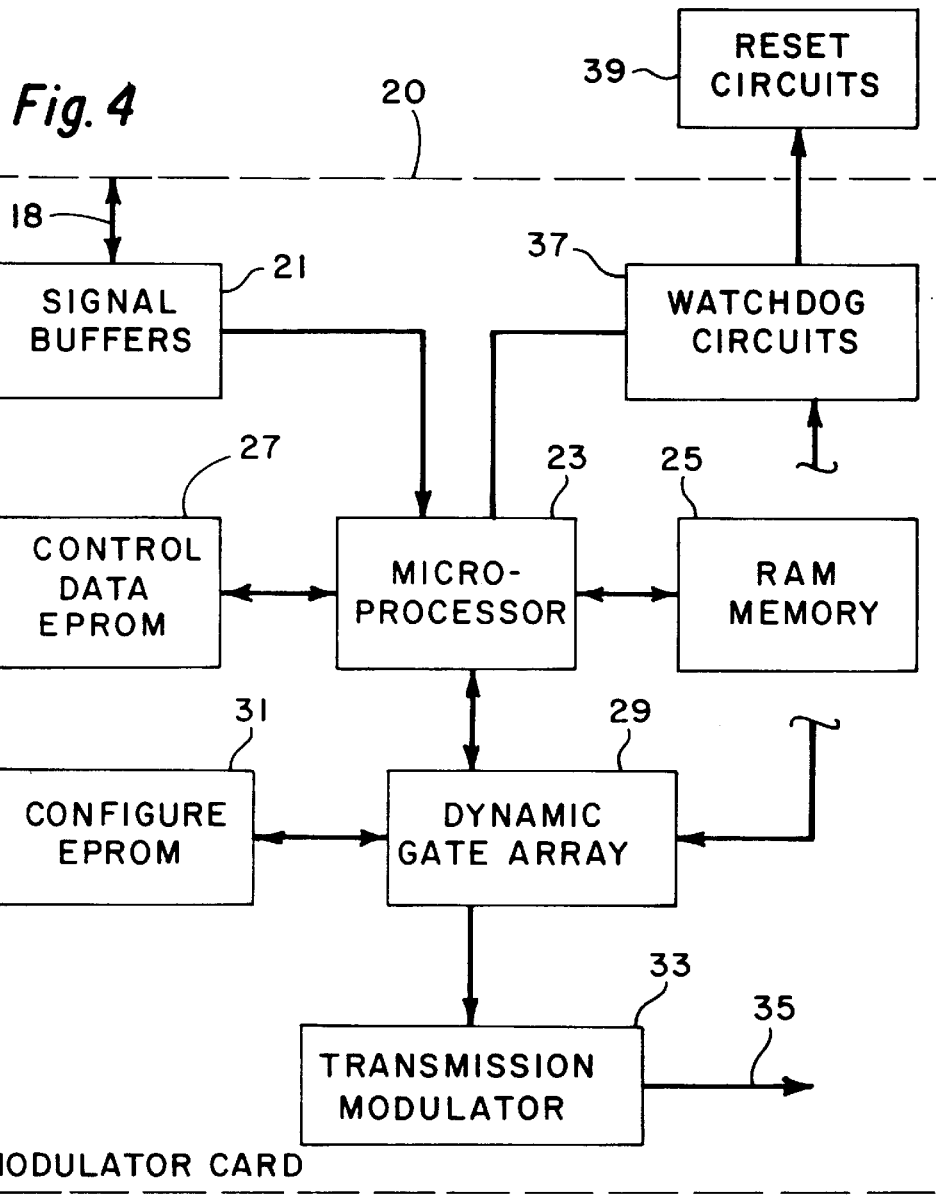
FIG. 4 is a block diagram illustrating a generic embodiment of modulator cards for use with the interactive, video display, data system.

A typical modulator card 20 is illustrated in FIG. 4. The card 20 receives the file data 18 via signal buffers 21 which in turn pass the data to a microprocessor 23 which controls the remanipulation of the data to be formatted. The microprocessor 23 sends the parsed data to a RAM memory 25 in 128 byte blocks. The RAM 25 typically is a 512 k byte RAM. Once the parsed data is loaded into the RAM 25, the microprocessor 23 is released by the system head end computer 16 to manipulate the transferred data 18 while the system head end computer 16 searches for more data. A current file will remain resident in the RAM 25 until it is replaced by a more recently created file. The microprocessor 23 then takes the stored file from the RAM 25 and handles that data under the control of a control data EPROM 27. Under the control of the EPROM 27, the microprocessor 23 feeds the data to a dynamic gate array 29. The switching configuration of the dynamic gate array 29 is determined and maintained by a configuration EPROM 31 which places the switches of the dynamic gate array 29 into the appropriate sequencing configuration. The configuration of the dynamic gate array 29 can thus be changed by the replacement of the resident configuration EPROM 31 with a different configuration EPROM in the field. The dynamic gate array 29 feeds the formatted data to a transmission modulator 33 which transmits the formatted data via any desirable signal carrier 35 to the customer's location. For example, the formatted signal may take the form of an FM radio signal frequency shift keyed. The current file is transmitted continuously over the CATV system for the system decoders. As shown in FIG. 4, the modulator cards 20 also include watchdog circuits 37 which, in cooperation with the microprocessor 23 and the dynamic gate array 29, operate the reset circuits 39 of the system head end computer 16 to assure that the system, which operates in an unattended location, does not malfunction as a result of momentary power surges or other fault conditions.

Figure 5:
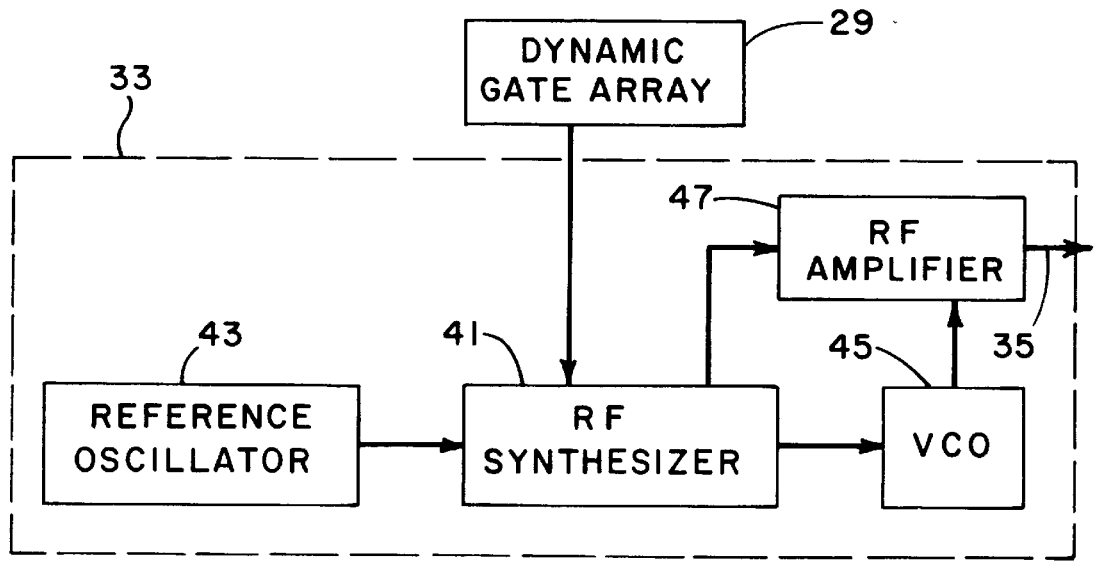
FIG. 5 is a block diagram illustrating a modular card for use in an interactive, video display, data system using RF signals.

In one specially preferred embodiment illustrated in FIG. 5, the modulator card 20 includes a transmission modulator 33 which consists of an RF synthesizer 41 which receives the formatted data from the dynamic gate array 29 and, stabilized by a reference oscillator 43, controls a voltage control oscillator 45 whose output drives an RF amplifier 47. The RF amplifier 47 may be turned off under the control of the dynamic gate array 29 during periods when data transmission is suspended.

Figure 6:
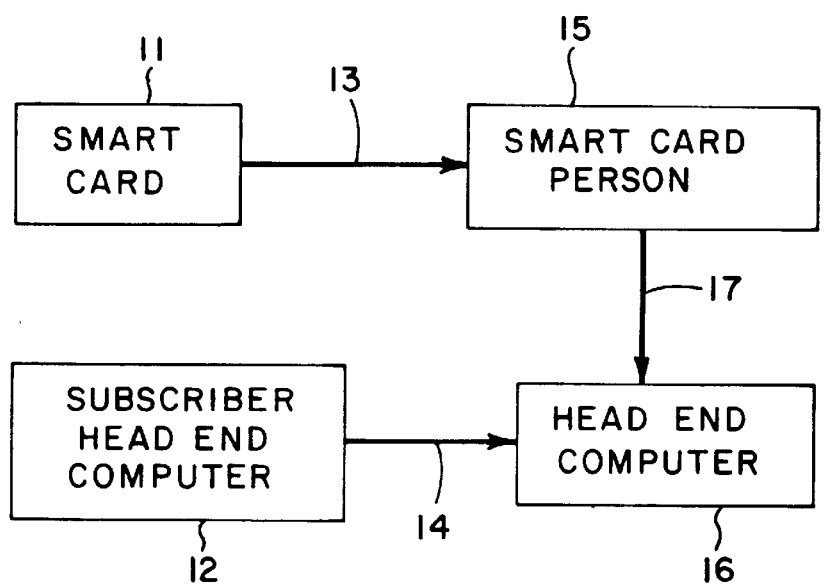
FIG. 6 is a block diagram illustrating the use of a smart card and interface in the interactive, video display, data system head end computer.

As shown in FIG. 6, the system head end computer 16 may also be controlled via a smart card 11 which, when inserted into a smart card reader 15 connected to a serial port of the system head end computer 16, which would cause the modulator card 20 to encrypt the data to be displayed portion of the composite signal 14 prior to transmission to the customer.

Figure 7:
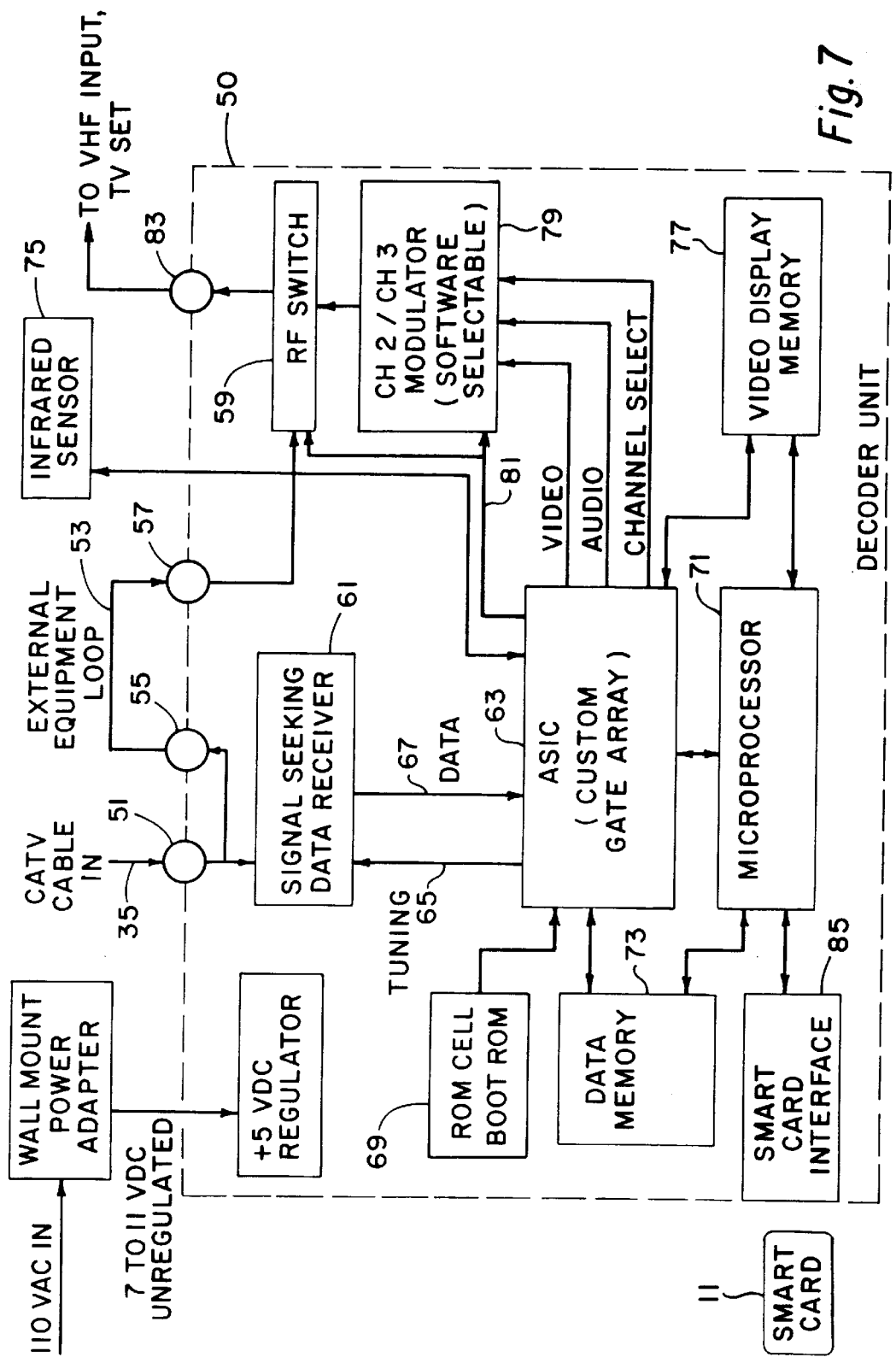
FIG. 7 is a block diagram of a preferred embodiment of the interactive, video display, data system decoder including the use of a smart card and interface in the decoder.

A preferred embodiment of a radio frequency decoder 50 to be located on the customer's premises for connection between the modulator card 20 and customer's TV is illustrated in FIG. 7. The formatted signal 35, which includes the object code, the to-be-displayed data in either encrypted or unencrypted form, the font tables and formats, is received at the decoder CATV cable-in terminal 51. From the cable-in terminal 51, all the signals of the cable TV service are fed via an external equipment loop 53 connected between terminals 55 and 57 of the decoder to an RF switch 59 which is part of the decoder 50. The formatted signal 35 is also fed through the cable-in terminal 51 to a signal seeking data receiver 61. The data receiver 61 is located prior to any equipment connected in the external loop 53 in order to prevent alteration of the formatted data signal to the receiver 61. The receiver 61 is a frequency agile device which tunes across the FM band in search of data to be passed on to a custom gate array 63. A tuning line 65 between the custom gate array 63 and the signal seeking data receiver 61 sets the receiver 61 at an appropriate frequency and data is transferred via a data transfer line 67 from the signal seeking data receiver 61 to the custom gate array 63. If no usable data is present at the selected frequency, the tuning line 65 is automatically adjusted to a new frequency and the test rerun until a frequency containing usable data is found. A ROM cell boot ROM 69, which contains a small portion of the object code, allows a microprocessor 71 to receive its full object code. The ROM cell boot ROM 69 determines the type of material to be sought by the microprocessor 71. As the tuning line 65 sets the receiver 61 to a frequency at which usable data is transmitted to the custom gate array 63 via the data line 67, the custom gate array 63 passes that data to a data memory 73 which stores object code in one location and data to be displayed in another location. The object code is then accessed from the data memory 73 by the microprocessor 71 which then manipulates the data in conformance with the object code. Once a threshold amount of data has been stored, the microprocessor 71 becomes responsive to an infrared sensor 75 under the control of the customer, such as a remote control device located on the customer's premises. As usable data is to be displayed at the customer's location, the microprocessor 71 sends the necessary data converted by font tables to a video display memory 77. The microprocessor 71 then commands the custom gate array 73 to retrieve the data stored in the video display memory 77 and send it via audio and video lines to the modulator 79. The custom gate array 63 controls the RF switch 59 and the modulator 79 via switch lines 81 so that the modulator 79 is operating only when the command to operate is given via the infrared sensor 75 and sufficient usable information is available for transfer. With the modulator 79 and the RF switch 59 turned on, the usable signal is transmitted from the decoder 50 via an output terminal 83 to the customer's TV set VHF input.

As shown in FIGS. 6 through 9, the interactive, video display, data system head end computer 16 and the decoder 50 may incorporate smart card interfaces 15 and 85. These interfaces 15 and 85 will allow smart cards 11 with imbedded keys to be able to be used to encrypt data before it is transmitted over the system and decrypt the data after it is received at the subscriber unit 50. At the system headend, an encrypted software program within the headend computer 16 may be used in lieu of the smart card 11 and reader 15 to store the keys needed to encrypt the data to be transmitted.

To send encrypted data, a random number or seed is first generated by a program within the headend computer 16. Next, the appropriate imbedded key (the one designated for that month, week, or chosen period) is selected and loaded into the encryption algorithm which can be the National Bureau of Standards Data Encryption Standard (DES). The random number is encrypted (or decrypted) using the DES algorithm which has been initialized and loaded with the appropriate key, thereby producing a result which is the current system seed key. This seed key is then loaded into the custom or system specific algorithm (i.e. polynomial generator) through which the actual transmitted data is passed. The initial random number or seed is transmitted in clear text along with the encrypted data.

When the data is received by the subscriber unit 50, a current period identifier (i.e. the current date) may be used to identify which of the keys previously and securely imbedded into the smart card 11 will be used for the decryption process. This key must be the same one used at the headend computer 16 for this period. The clear text random number seed is passed to the smart card through the smart card interface 85 along with the appropriate imbedded key identifier. The smart card 11 is then instructed to load the identified imbedded key into the initialized DES algorithm and to encrypt (or decrypt) the random number seed and present the results back through the smart card interface 85 to the decoder microprocessor 71 as the current seed key. The microprocessor 71 will then load this current seed key into the custom or system specific algorithm within the gate array 63. This algorithm must be the same one being used presently by the headend computer 16. The transmitted, encrypted data is passed through this algorithm as it is received, thereby decrypting the data to clear text for storage in the data memory 73 of the decoder 50.

While the interactive, video display, data system may appear somewhat complicated, a typical operation of the interactive, video display, data system by the customer, for example, access program guide services, is quite simple. For a 50 channel cable system a current program listing file with a four hour program window to display program schedules up to four hours in the future takes approximately four minutes to transmit. Therefore, every four minutes the same file is repeated and transmitted throughout the cable system. The decoders 50 do not have a non-volatile memory, so, if power to a decoder 50 is interrupted for any reason, even momentarily, the previously stored information is lost. However, within approximately four minutes after power is restored, the decoder 50 will reload the currently transmitted file and, once again, be ready to operate and display the program guide.

When the decoder 50 has been loaded with the currently transmitted file, it will then accept commands from the customer's infrared remote control unit 75. These commands will allow it to display the data on the screen of the customer's TV set. The properly formatted program data is organized into pages listing the program information in grid format, the arrangement commonly used in newspapers to display prime-time programming where the channel numbers are listed on the vertical axis of the grid and time is displayed across the top of the grid on the horizontal axis and each program occupies a specific box on the grid, thereby identifying it by channel and time.

A cable subscriber who wishes to use the guide while viewing TV would typically press a single designated button on his CATV converter's infrared remote control 75 to call the guide to the screen where it will replace the normal programming. To call the guide, the subscriber would press and hold the designated button down for approximately three seconds. The action of holding the button down for this period will distinguish between pushing the button in order to achieve the normal function associated with that button and pushing the button to summon the guide. Once the guide is being displayed, a single short push on the same button would typically be used to page through all the information of the guide for the first two hour block of time. For a 50 channel cable system, at 6 channels per page, it will take 9 pages of display screens to show all the programming available.

When the guide is being displayed, the customer will be able to shift to the next two hour block of program information by a short push on a second designated button. Pushing this button while displaying any given page will advance the programming time by two hours and show the programming available for the channels on that page during the next contiguous two hour time period. Once in the advanced time display, a subsequent push on the same button will return the user to the initial two hour period so, if desired, he may toggle back and forth between two hour blocks to plan program viewing. The customer must use the initial button to page through the advance time block as before.

To exit the guide once the desired information has been found, the customer may hold the initial button down for three seconds, thereby indicating his desire to exit, not just change pages, or, use a short push on any other button of the infrared remote 75. When the guide is removed, normal programming will return to the screen.

Whenever the guide is called, the screen will display the current local time to the minute in the upper left hand corner of the screen, and the first program listings will be for the present half hour of the current local time. Every half hour, on the hour or half hour, the program listings will slide one half hour to keep pace with current time. Even at this boundary time, however, a displayed page will not change while it is being displayed. Only when the next page is selected will the time boundary be changed for the display of that next page.

As hereinbefore discussed, a decoder 50 may have other uses than as a program guide. For example, the decoder might incorporate a smart card feature as a subscription device for a variety of additional controlled services. If a subscription smart card is inserted by the customer into the decoder 50, the decoder 50 will check to see if the subscription is current. If it is current, it will use a designated portion of the incoming data related to that service to obtain a decryption key from the smart card and subsequently decrypt the information associated with that service in order that it may be displayed in usable form on the TV screen for the customer.

A dedicated infrared remote control unit may be added to the system in order to allow the customer to have enough functions or buttons specifically related to the decoder system to allow the customer to manipulate the data in order to efficiently find desired information. The use of existing infrared remotes can become too unwieldy since there are not enough buttons with benign primary functions to allow the customer to interact properly with the guide once it is selected without, at the same time, causing unwanted operations of the primary equipment with which the infrared remote is associated, such as the TV set, the VCR, the CATV converter, etc.

The infrared data reception is handled by polling the input line from the infrared receiver 75. The input is sampled approximately every 160 microseconds to see if infrared information is being received. For example, two sequential samples of the infrared input line being low indicates infrared data is present and needs to be analyzed. Since there are over 100 different infrared remote control transmitters in use, it is necessary to analyze the received data by using two separate algorithms. In addition, there are several exception cases which must be handled. The first algorithm used is designed to be simple to implement, fast to execute, and uses a minimal amount of data storage for each different infrared remote unit 75 that is used. The second algorithm is designed to handle infrared remote codes where the timing difference between a HI or 1 bit is too small to distinguish it from a LOW or 0 bit. The exception cases handle infrared remotes which have data bits which are of substantially different lengths from the average data bit lengths.

In the first algorithm applied to the incoming data, the infrared input line is sampled for 2 sequential LOW samples. This is considered the start of an infrared data command. At this point, the microprocessor 71 stops processing incoming FM data information and allocates most of the CPU time to processing infrared data. The CPU continues sampling the input line and keeping track of how many LOW samples have occurred. If too many sequential LOW samples occur, then the CPU checks to see if this is an infrared code which is handled by an exception case. If it is an exception, then the CPU changes the timing parameters. Otherwise, the CPU flags this code as being an error and throws it away later.

As soon as the first HI sample occurs, then the CPU stores the pulse count information into a memory array buffer. At this point the CPU begins counting the number of HI samples that occur in a row. If a LOW sample occurs, then the pulse width count is stored into a memory array buffer. In addition, the LOW and HI pulse width counts are added together. If this is the first pulse count, then its value is saved into a register which holds the current pulse count for a LOW bit. All future pulse counts are compared to this count. If they are more than 480 microseconds greater than this count, then they are considered to be HI bits. However, if they are more than 480 microseconds lower than the stored count, then all of the previous bit values stored are changed to HI bits and this new count is now the current low bit count. At this point, the check done above for LOW samples is repeated, which is followed by the HI sample check.

These two checks are repeated and the bit values are stored until the infrared line is HI for more than 7 milliseconds. At this point another check is made to see if this is an exception case. If it is not an exception, then this is considered the end of the data command.

Now the data bit values calculated above are compared to the values stored for each of the infrared remote control units. If the number of bits are the same, and the bit sequence of HI and LOW bits matches one of the values stored, then this is considered to be a correct match and the infrared command is processed.

However, if the bit values received do not match one of the bit values stored, then the second algorithm is used. This algorithm is a simple pulse width comparison. The sequence of LOW and HI pulse widths received is compared to a table of values stored in memory. If the value of each pulse received is within plus or minus 480 microseconds of each value stored, then it is considered to be a correct match and the infrared command is processed.

If both of these algorithms fail to find a match with the values stored in memory, then this infrared command is ignored and the entire process done above is repeated.

A hardware input filter eliminates fast transitions on the infrared input line. This is done so that the CPU does not have to spend time sampling the input line several times to remove any noise spikes.

The decoder unit 50 contains only a small boot EPROM 69. This EPROM 69 contains only the code necessary to power up, initialize the board, control the watchdog timer, test the hardware for errors, tune the FM receiver and receive frames of data from the FM data transmitter. The rest of the instruction code is received in the FM data being processed. This allows the decoders 50 to be upgraded at the customer's home at any time by simply changing the microprocessor code which is downloaded. It is possible to change how the infrared remote control units are handled, how pages are displayed on the TV screen, how the character font table is mapped, and even some parameters for how the FM data is handled.

The protocol used to allow this is relatively simple. First, the microprocessor 71 powers up running out of the EPROM 69. Then it copies the microprocessor code from the EPROM 69 to a psuedo static RAM 73. Once this is done then it begins running instructions from the psuedo static RAM 73. This code tunes the FM receiver to the data channel and then the CPU begins processing data frames received from the FM broadcast. If a frame being received comes in correctly and has a valid checksum, then it is stored starting at the RAM memory location to the page number received * 32 K plus the block number received * 128. However, if valid data was already stored at this location, then each byte received is compared to each byte stored. And if any bytes are different, then a register is incremented and the frame just received is thrown away. Once the register increments above 3 for object code or 0 for data frames, then the frame stored in memory is replaced by the frame just received. When all of the frames that are needed have been stored in memory, then the CPU allows infrared remote commands to be processed and pages of data to be displayed on the TV screen.

Thus, it is apparent that there has been provided, in accordance with the invention, an interactive, video display, data system that fully satisfies the objects, aims and advantages set a forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An interactive video guide system comprising:
   a first database comprising national television program information for television programs televised nationally;
   a second database comprising local television program information for television programs televised locally;
   a storage device comprising at least one version of interactive video guide object code;
   a combining mechanism which forms a dataset from at least a portion of said national television program information from said first database, at least a portion of said local television program information from said second database, and a subset of said at least one version of interactive video guide object code from said storage device;
   a signal former which forms a composite signal from said dataset;
   a transmitter which transmits said composite signal;
   at least one receiver which receives said composite signal from said transmitter; and
   a display driver which generates a signal to drive a video display in which said dataset can appear in the form of an interactive video program guide.

2. The system of claim 1, wherein said first database and said second database are parts of a single database.

3. The system of claim 1, wherein said signal former encrypts said composite signal.

4. The system of claim 3, wherein said signal former uses a smart card to hold keys used to encrypt said composite signal.

5. The system of claim 1, wherein said at least one receiver decrypts said composite signal.

6. The system of claim 5, wherein said at least one receiver uses a smart card to hold keys used to decrypt said composite signal.

7. The system of claim 1, wherein said transmitter transmits said composite signal on at least one of a plurality of frequencies.

8. The system of claim 1, wherein said receiver comprises a frequency agile receiver for scanning said plurality of frequencies and receiving said composite signal on said at least one of said plurality of frequencies.

9. The system of claim 1, wherein said transmitter continuously updates and retransmits said composite signal.

10. The system of claim 1, wherein said transmitter pauses between updates and retransmissions of said composite signal.

11. The system of claim 1, wherein said receiver extracts said at least one version of interactive video guide object code from said composite signal and executes at least one of said at least one version of interactive video guide object code.

12. A method of generating an interactive video guide display comprising:
    selecting a subset of national television program information from a first database comprising national television program information for television programs televised nationally;
    selecting a subset of local television program information from a second database comprising local television program information for television programs televised locally;
    selecting at least one version of interactive video guide object code from a storage device comprising at least one version of interactive video guide object code;
    combining said subset of said national television program information from said first database, said subset of said local television program information from said second database, and said at least one version of interactive video guide object code from said storage device, to form a dataset;
    forming a composite signal from said dataset;
    transmitting said composite signal;
    receiving said transmitted composite signal; and
    generating a signal to drive a video display in which said dataset appears in the form of an interactive video program guide.

13. The method of claim 12, wherein said first database and said second database are parts of a single database.

14. The method of claim 12, wherein said forming further comprises encrypting said composite signal.

15. The method of claim 14, wherein said forming comprises using a smart card to hold keys used to encrypt said composite signal.

16. The method of claim 12, wherein said receiving further comprises decrypting said composite signal.

17. The method of claim 16, wherein said receiving comprises using a smart card to hold keys used to decrypt said composite signal.

* * * * *